US008145413B2

(12) United States Patent
Shida

(10) Patent No.: US 8,145,413 B2
(45) Date of Patent: Mar. 27, 2012

(54) PERIMETER MONITOR

(75) Inventor: Mitsuhisa Shida, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 470 days.

(21) Appl. No.: 12/445,535

(22) PCT Filed: Aug. 4, 2008

(86) PCT No.: PCT/JP2008/063974
§ 371 (c)(1),
(2), (4) Date: Apr. 14, 2009

(87) PCT Pub. No.: WO2009/022567
PCT Pub. Date: Feb. 19, 2009

(65) Prior Publication Data
US 2010/0021011 A1    Jan. 28, 2010

(30) Foreign Application Priority Data
Aug. 10, 2007   (JP) ................. 2007-209994

(51) Int. Cl.
G06G 7/76    (2006.01)
G06K 9/34    (2006.01)
G08G 1/00    (2006.01)
(52) U.S. Cl. ...................................... 701/117; 382/104
(58) Field of Classification Search .......... 701/117–119, 701/28, 96; 340/901, 903, 425.5, 435–438; 348/148; 382/104
See application file for complete search history.

(56) References Cited

U.S. PATENT DOCUMENTS

| 6,356,189 | B1 | 3/2002 | Fujimaki |
| 6,911,997 | B1* | 6/2005 | Okamoto et al. .............. 348/148 |
| 7,663,476 | B2* | 2/2010 | Watanabe et al. .............. 340/435 |
| 2005/0024494 | A1* | 2/2005 | Hirota et al. ................... 348/148 |
| 2005/0090950 | A1 | 4/2005 | Sawamoto et al. |
| 2007/0016372 | A1* | 1/2007 | Browne et al. ................ 701/213 |
| 2007/0147055 | A1 | 6/2007 | Komatsu |

FOREIGN PATENT DOCUMENTS

| JP | A-04-103442 | 4/1992 |
| JP | A-06-230131 | 8/1994 |
| JP | A-6-230131 | 8/1994 |
| JP | A-2000-293799 | 10/2000 |

(Continued)

OTHER PUBLICATIONS

Mar. 9, 2010 International Preliminary Report on Patentability issued in corresponding International Application No. PCT/JP2008/063974.

*Primary Examiner* — Yonel Beaulieu
(74) *Attorney, Agent, or Firm* — Oliff & Berridge, PLC

(57) ABSTRACT

When vehicle group constituent vehicles $V_1$ to $V_4$ form a vehicle group, a logical unit 40a for distributing perimeter monitoring regions among the vehicles controls a monitoring region s of a sensor 23 of each vehicle so that the monitoring region s is changed with comparison to that during independent traveling. As a result, even in a state in which an area surrounding the vehicle group cannot be sufficiently monitored with the monitoring region identical to that during independent traveling, the monitoring capacity of the area surrounding the vehicle group can be increased by changing the monitoring region s of the sensor 23 of each vehicle during traveling as a vehicle group.

18 Claims, 11 Drawing Sheets

FOREIGN PATENT DOCUMENTS

| | | |
|---|---|---|
| JP | B2-3191621 | 7/2001 |
| JP | A-2002-154349 | 5/2002 |
| JP | A-2002-266672 | 9/2002 |
| JP | A-2002-329298 | 11/2002 |
| JP | A-2005-100336 | 4/2005 |
| JP | A-2005-100366 | 4/2005 |
| JP | A-2006-021632 | 1/2006 |
| JP | A-2006-318093 | 11/2006 |
| JP | A-2007-099078 | 4/2007 |
| JP | A-2007-179969 | 7/2007 |

* cited by examiner

PERIMETER MONITOR

TECHNICAL FIELD

The present invention relates to a perimeter monitoring device, and more particularly to a perimeter monitoring device that controls perimeter monitoring units of a plurality of vehicles, each vehicle carrying the perimeter monitoring unit for monitoring the perimeter.

BACKGROUND ART

A technology of forming a traveling vehicle group of vehicles equipped with perimeter monitoring devices that monitor the perimeter has been suggested. For example, Patent Document 1 discloses a vehicle group travel control device in which when the vehicles travel as a group, sideward vehicle detection data provided by each vehicle are sent to the leading vehicle, an object vehicle traveling on the adjacent lane within the vehicle group length range is regularly monitored, and when an obstacle is detected in front on the traveling road and the collision therewith cannot be avoided by brake operation, the leading vehicle performs an avoidance scheduling and issues an avoidance method instruction to the following vehicles. As a result, the vehicles that travel cooperatively can travel, while automatically avoiding the obstacle present on the road.

[Patent Document 1] Japanese Patent Application Laid-open No. 2002-266672.

DISCLOSURE OF THE INVENTION

Problem to be Solved by the Invention

However, a problem associated with the above-described technology is that, although a plurality of vehicles travel by forming a vehicle group, the capacity of monitoring the perimeter is decreased with comparison to that of independent traveling of each vehicle. For example, in a leading vehicle of the vehicle group, a rearward recognition sensor such as a camera and a radar merely recognizes the following vehicle and is in an idle state in which no particular function is performed. In the following vehicle of the vehicle group, a white lane recognition camera does not function as intended because the white line is hidden by the leading vehicle. Further, a perimeter recognition sensor, such as a radar, of the following vehicle merely recognizes the rear end of the leading vehicle and cannot sufficiently monitor the area surrounding the vehicle group.

The present invention has been created to resolve the above-described problems and it is an object thereof to provide a perimeter monitoring device that can improve the monitoring capacity for an area surrounding a vehicle group with respect to a plurality of vehicles, each carrying a perimeter monitoring unit that monitors the perimeter.

Means for Solving the Problem

The present invention provides a perimeter monitoring device that controls perimeter monitoring units of a plurality of vehicles each carrying the perimeter monitoring unit that monitors a perimeter, the perimeter monitoring device having a monitoring region control unit that controls a monitoring region of the perimeter monitoring unit of each vehicle so as to change the monitoring region with comparison to the monitoring region during independent traveling of the vehicles when the plurality of vehicles form a group of vehicles that share at least part of a traveling plan.

With such a configuration, when a plurality of vehicles form a vehicle group, the monitoring region control unit controls the monitoring region of the perimeter monitoring unit of each vehicle so as to change the monitoring region with comparison to the monitoring region during independent traveling of the vehicles. Therefore, even in a state in which an area surrounding the vehicle group cannot be sufficiently monitored with the monitoring region identical to that during independent traveling, the monitoring capacity of the area surrounding the vehicle group can be increased by changing the monitoring region of the perimeter monitoring unit of each vehicle during traveling as a vehicle group. Further, in accordance with the present invention, the "traveling plan" means at least one selected from a destination, speed pattern, and traveling route to the destination. In other words, in accordance with the present invention, the "traveling plan" is, for example, a plan such as speed information or arrival time and means information that determines how the vehicles have to travel to reach a predetermined location, for example, a destination. Thus, the traveling plan is the variation of the target position with time, for example, a target route and a target speed pattern. Here, the target route is route information on the travel schedule. The target speed pattern is configured by an interval necessary for each vehicle or a vehicle group to travel any distance. Information necessary to generate the target speed pattern is, for example, target acceleration or jerk (differential value of acceleration), target maximum acceleration or maximum jerk, target speed, or distance required to attain the target speed.

In this case, it is preferred that the monitoring region control unit perform control such that when the plurality of vehicles form the vehicle group, a surface area in which the monitoring regions of the perimeter monitoring units of the vehicles overlap becomes smaller than that during independent traveling of the vehicles.

With such a configuration, when the plurality of vehicles form the vehicle group, the monitoring region control unit performs control such that a surface area in which the monitoring regions of the perimeter monitoring units of the vehicles overlap becomes smaller than that during independent traveling of the vehicles. Therefore, the monitoring region of the vehicles belonging to the vehicle group as a whole is increased and the monitoring capacity of the area surrounding the vehicle group can be further increased.

Further, it is preferred that the monitoring region control unit perform control such that when the plurality of vehicles form the vehicle group, a monitoring region of the perimeter monitoring unit of the vehicle that is a leading vehicle of the vehicle group becomes further forward of the vehicle group than that during independent traveling of the vehicles.

When a vehicle group is formed, the deceleration that enables the entire vehicle group to stop safely is less than that during independent traveling of the vehicles. Therefore, when a vehicle group is formed, it is necessary to monitor a zone father in front than during impendent traveling of the vehicles. However, with such a configuration, when the plurality of vehicles form the vehicle group, the monitoring region control unit performs control such that a monitoring region of the perimeter monitoring unit of the vehicle that is a leading vehicle of the vehicle group becomes further forward of the vehicle group than that during independent traveling of the vehicles. Therefore, the monitoring capacity in front of the vehicle group is increased and safety can be improved. In accordance with the present invention, the "leading vehicle" means a vehicle that is positioned at the head of the vehicle group.

Alternatively, it is preferred that the perimeter monitoring unit be a camera and the perimeter region control unit control the monitoring region by changing a focal distance of the camera when the plurality of vehicles form the vehicle group.

With such a configuration, when the plurality of vehicles form the vehicle group, the perimeter region control unit controls the monitoring region by changing a focal distance of the camera. Therefore, the monitoring region can be controlled by changing the monitoring region by a simple method, without employing any means, for example, such that changes the orientation of the perimeter monitoring device.

Further, it is preferred that the perimeter region control unit control the monitoring region of the perimeter monitoring unit by changing a distance between the vehicles when the plurality of vehicles form the vehicle group.

With such a configuration, when the plurality of vehicles form the vehicle group, the perimeter region control unit controls the monitoring region of the perimeter monitoring unit by changing a distance between the vehicles. Therefore, the monitoring region can be controlled by changing the monitoring region by a simple method, without employing any means, for example, such that changes the orientation of the perimeter monitoring device.

In addition, it is preferred that when the plurality of vehicles form the vehicle group and the vehicle group makes a turn, the perimeter region control unit perform control such that a region on the inner side of the turn of the vehicle that is a preceding vehicle becomes a monitoring region of the perimeter monitoring unit of the vehicle that follows the vehicle that is the preceding vehicle.

With such a configuration, when the plurality of vehicles form the vehicle group and the vehicle group makes a turn, the perimeter region control unit performs control such that a region on the inner side of the turn of a vehicle that is a preceding vehicle becomes a monitoring region of the perimeter monitoring unit of the vehicle that follows the vehicle that is the preceding vehicle. Therefore, drag-in accidents during right or left turn can be prevented. In accordance with the present invention, "preceding vehicle" means a vehicle that is ahead of a certain vehicle within a vehicle group, regardless of the position in the vehicle group.

Effects of the Invention

With the perimeter monitoring device in accordance with the present invention, the monitoring capacity of the area surrounding a vehicle group can be increased.

Figure 1:
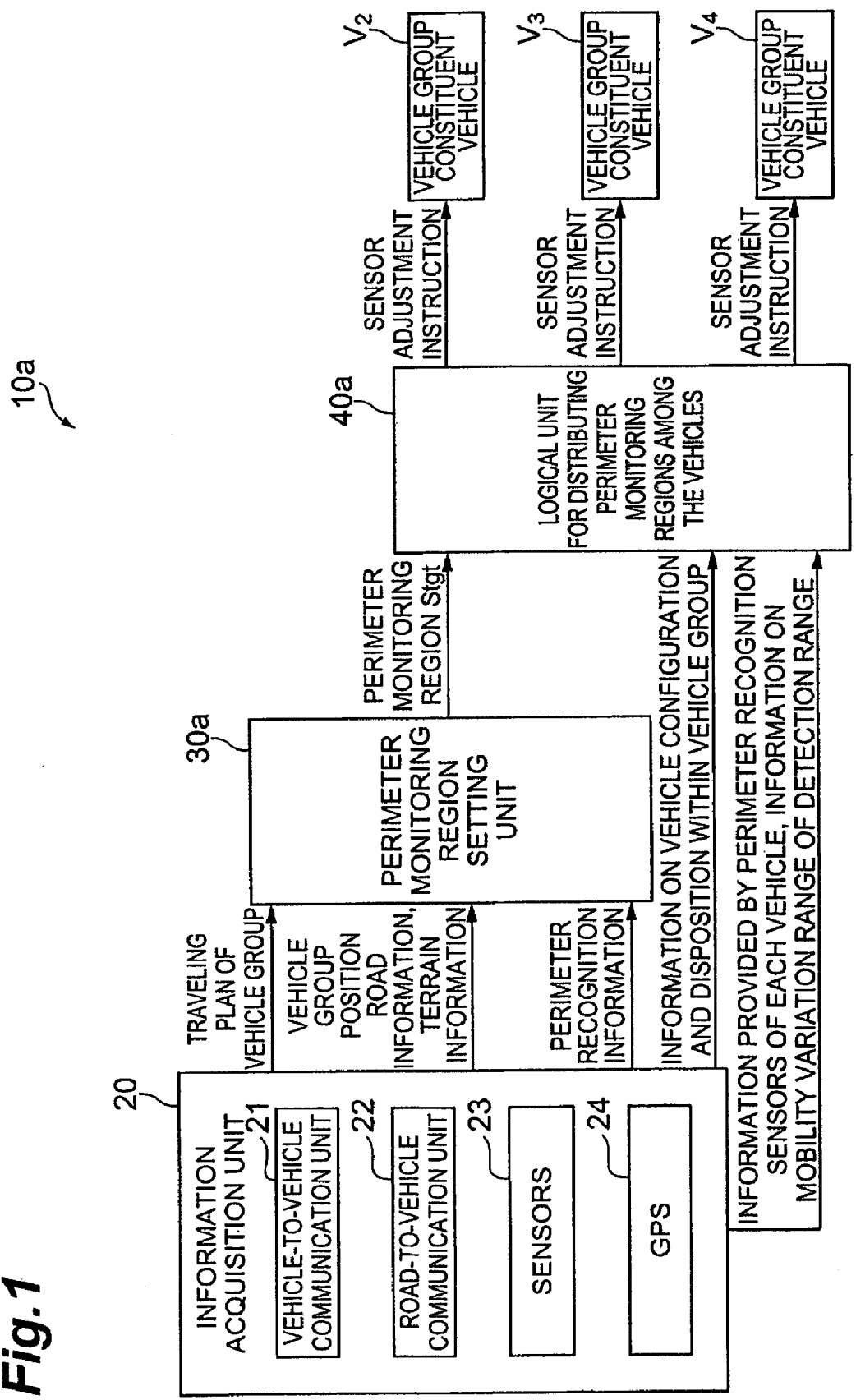
FIG. 1 is a block diagram illustrating the configuration of a perimeter monitoring device of the first embodiment.

EXPLANATION OF REFERENCE NUMERALS $10a$, $10b$ perimeter monitoring device
20 information acquisition unit
21 vehicle-to-vehicle communication unit
22 road-to-vehicle communication unit
23 sensors
24 GPS
$30a$ perimeter monitoring region setting unit
$30b$ vehicle group illumination region setting unit
$40a$ logical unit for distributing perimeter monitoring regions among the vehicles
$40b$ logical unit for distributing light among the vehicles
$V_1$ to $V_4$ vehicle group constituent vehicle
$V_o$ vehicle outside the vehicle group
$V_{oo}$ oncoming vehicle outside the vehicle group
$V_{of}$ vehicle outside the vehicle group that travels in front in the same direction
$S_{tgt}$, $S_{tgt}'$ perimeter monitoring region
s monitoring region
s', s" illumination region
e driver direct field of vision
m mirror field of vision
b blind angle

BEST MODE FOR CARRYING OUT THE INVENTION

The perimeter monitoring device of embodiments of the present invention will be described below with reference to the appended drawings. FIG. 1 is a block diagram illustrating the configuration of the perimeter monitoring device of the first embodiment. A perimeter monitoring device $10a$ is installed at a plurality of vehicles forming a group of vehicles that share at least part of a traveling plan and serves to control a unit monitoring the perimeter of a vehicle, such as a radar or a camera of each vehicle.

The perimeter monitoring device $10a$ includes an information acquisition unit 20, a perimeter monitoring region setting unit $30a$, and a logical unit $40a$ for distributing perimeter monitoring regions among the vehicles.

The information acquisition unit 20 includes a vehicle-to-vehicle communication unit 21 for exchanging information between the vehicles forming the vehicle group by wireless communication, a road-to-vehicle communication unit 22 that acquires information from road infrasensors, various sensors 23 for monitoring the perimeter of the vehicle, and a GPS 24 for acquiring information on the vehicle position, and the like.

The vehicle-to-vehicle communication unit 21 exchanges information between the own vehicle and other vehicles by wireless communication, this information including a traveling plan of the vehicle group, position of the vehicle group, road information, terrain information, perimeter recognition information provided by various sensors, information relating to configuration of vehicles within the vehicle group, information relating to the arrangement of vehicles within the vehicle group, information relating to the perimeter recognition sensors installed at each vehicle, information relating to a mobility range of the perimeter recognition sensors, instructions to change the monitoring region of the perimeter recognition sensors, and the like.

The road-to-vehicle communication unit 22 acquires information relating to detection results or detectable region of road infrasensors from the road infrasensors disposed at the roadside strip or the like.

The sensors 23 detects obstacles such as another vehicle present on the perimeter of the own vehicle. Alternatively, the sensors 23 are also used for recognizing a white line or the like of the road. Thus, the sensors 23 function as the perimeter monitoring unit set forth in the claims. In the sensors 23 installed on each vehicle of the vehicle group, the monitoring region can be freely changed by changing the monitoring distance and monitoring direction of the sensors. Examples of sensors that can be advantageously used as the sensors 23 include a milliwave radar, a laser radar, an image sensor such as a stereo camera, and an ultrasound sensor. A combination of different sensors may be also used. The sensors 23 can also include lights illuminating the desired monitoring region.

A milliwave radar or laser radar irradiates a detection wave such as an electromagnetic wave in a milliwave range or a laser beam to a zone in front of the vehicle, while scanning the detection wave in the horizontal direction, receives a reflected wave that is reflected by an obstacle surface such as another vehicle, and detects a distance to the other vehicle, a relative speed of the vehicles, and a direction thereof. The direction of the other vehicle is detected using the reflected wave angle, the distance to the other vehicle is detected by the time from the irradiation of an electromagnetic wave to the reception of the reflected wave, and the speed of the other vehicle is detected by the change in frequency of the reflected wave (Doppler effect).

A stereo camera has a pair of CCD cameras that acquire images of obstacles such as other vehicles and an image processing unit that detects another vehicle by image recognition from the acquired images. The stereo camera extracts other vehicles from among the images picked up by the CCD cameras by edge extraction or pattern recognition processing. Further, a distance to the other vehicle and a lateral displacement from the own vehicle are found by a triangulation system based on the difference in positions of the obstacle in the left and right acquired images, and a relative speed is found from a variation with respect to the distance found in the previous frame.

The GPS (Global Positioning System) 24 detects a position of the own vehicle on the basis of a received GPS satellite signal. Further, the traveling distance is computed based on a vehicle speed signal, and a vehicle advance direction is detected correspondingly to a signal from a gyro sensor. Further, the GPS 24 acquires road information such as lane configuration or road curvature of the road where the own vehicle travels from an incorporated map information storage device such as a hard disk or DVD disk.

The perimeter monitoring region setting unit 30a and logical unit 40a for distributing perimeter monitoring regions among the vehicles function as a monitoring region control unit set forth in the claims. The perimeter monitoring region setting unit 30a and logical unit 40a for distributing perimeter monitoring regions among the vehicles are configured by a microprocessor that performs computations, a ROM that stores a program for executing a variety of processing operations in the microprocessor, a RAM that stores various data such as computation results, and a back-up RAM that stores the information contents of the RAM by using a 12 V battery.

The perimeter monitoring region setting unit 30a is designed for setting a perimeter monitoring region $S_{tgt}$ that has to be monitored for the entire vehicle group on the basis of the traveling plan of the vehicle group, position of the vehicle group, road information, and terrain information acquired by the information acquisition unit 20 and on the perimeter recognition information obtained with the sensors.

The logical unit 40a for distributing perimeter monitoring regions among the vehicles is designed to control a monitoring region of the sensors 23 installed at vehicle group constituent vehicles $V_2$ to $V_4$ that form the vehicle group on the basis of the perimeter monitoring region $S_{tgt}$ that has been set by the perimeter monitoring region setting unit 30a, information relating to configuration of vehicles within the vehicle group, information relating to the arrangement of vehicles within the vehicle group, information relating to the perimeter recognition sensors installed at each vehicle, and information relating to the mobility range of the perimeter recognition sensors that have been acquired by the information acquisition unit 20. A sensor adjustment command relating to the vehicle group constituent vehicles $V_2$ to $V_4$ is sent to the vehicle group constituent vehicles $V_2$ to $V_4$ via the vehicle-to-vehicle communication unit 21 of the information acquisition unit 20. Further, the logical unit 40a for distributing perimeter monitoring regions among the vehicles sends a traveling plan such as a distance between the vehicles that is adequate for causing each of the sensors 23 to function to the vehicle group constituent vehicles $V_2$ to $V_4$ via the vehicle-to-vehicle communication unit 21.

The operation of the perimeter monitoring device of the present embodiment will be described below.

(Processing Procedure 1: Operation During Distribution of Monitoring Regions of the Vehicles)

Figure 2:
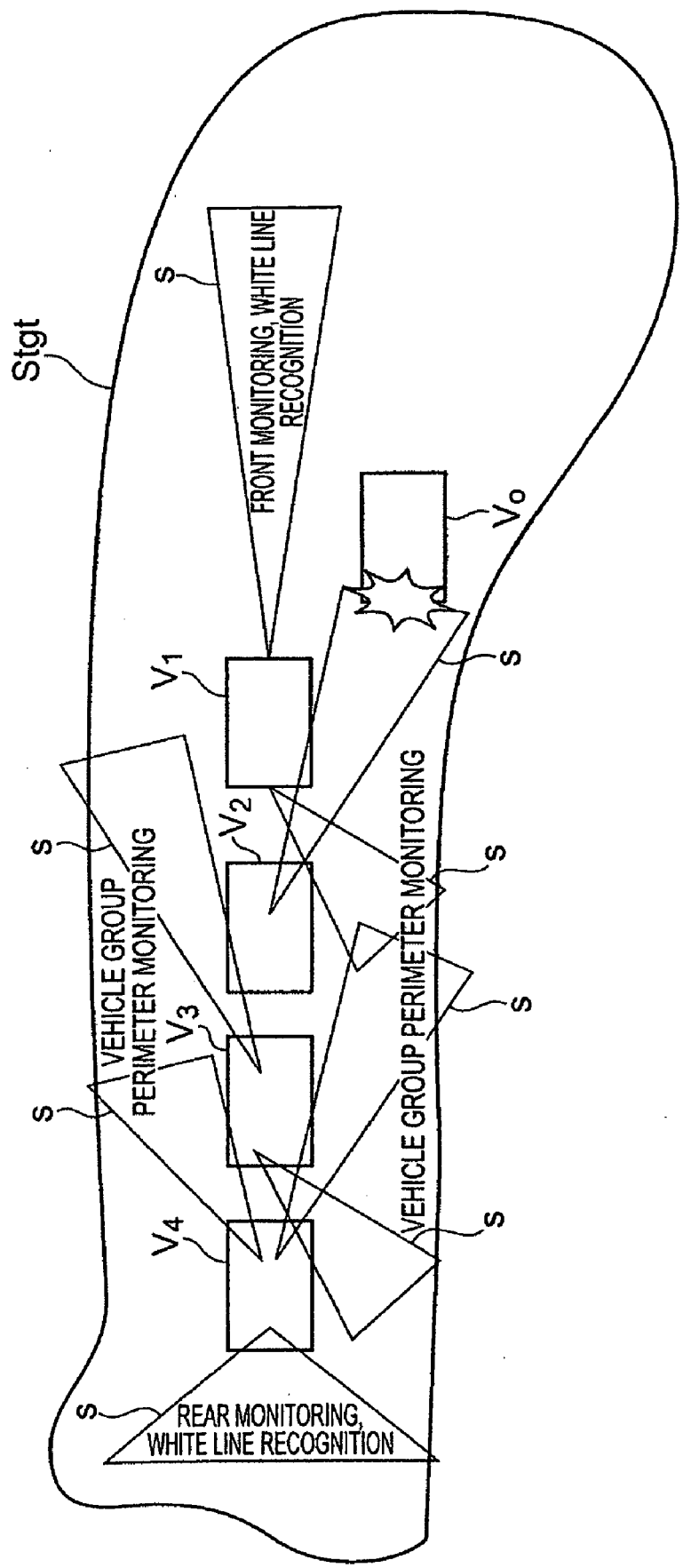
FIG. 2 is a plan view illustrating the state in which perimeter monitoring is performed in the entire vehicle group.

The operation during distribution of monitoring regions of the vehicles in the perimeter monitoring device 10a of the present embodiment will be described below. In the present embodiment, as shown in FIG. 2, the perimeter monitoring device 10a changes the monitoring regions of each of vehicle group constituent vehicles $V_1$ to $V_4$ with comparison to that during independent travelling. The vehicle group constituent vehicle $V_1$, which is a leading vehicle, monitors a remote distance in front thereof with sensors 23 and also recognizes a white line of the road, thereby detecting a relative position. The vehicle group constituent vehicles $V_2$ to $V_4$ that follow the leading vehicle distribute the sensors 23 of own vehicle in the left-right direction and far-close direction so as to prevent overlapping with the monitoring region s of the sensors 23 of the leading vehicle, thereby increasing the monitoring capacity with respect to an obstacle such as a vehicle $V_o$ that does not belong to the vehicle group. The below-described operation of the perimeter monitoring device 10a of the present embodiment is assumed to be performed by the perimeter monitoring device 10a installed at the vehicle group constituent vehicle $V_1$, which is the leading vehicle, on the behalf of the vehicle group constituent vehicles $V_2$ to $V_4$, which are the vehicle that follow the leading vehicle.

Figure 3:
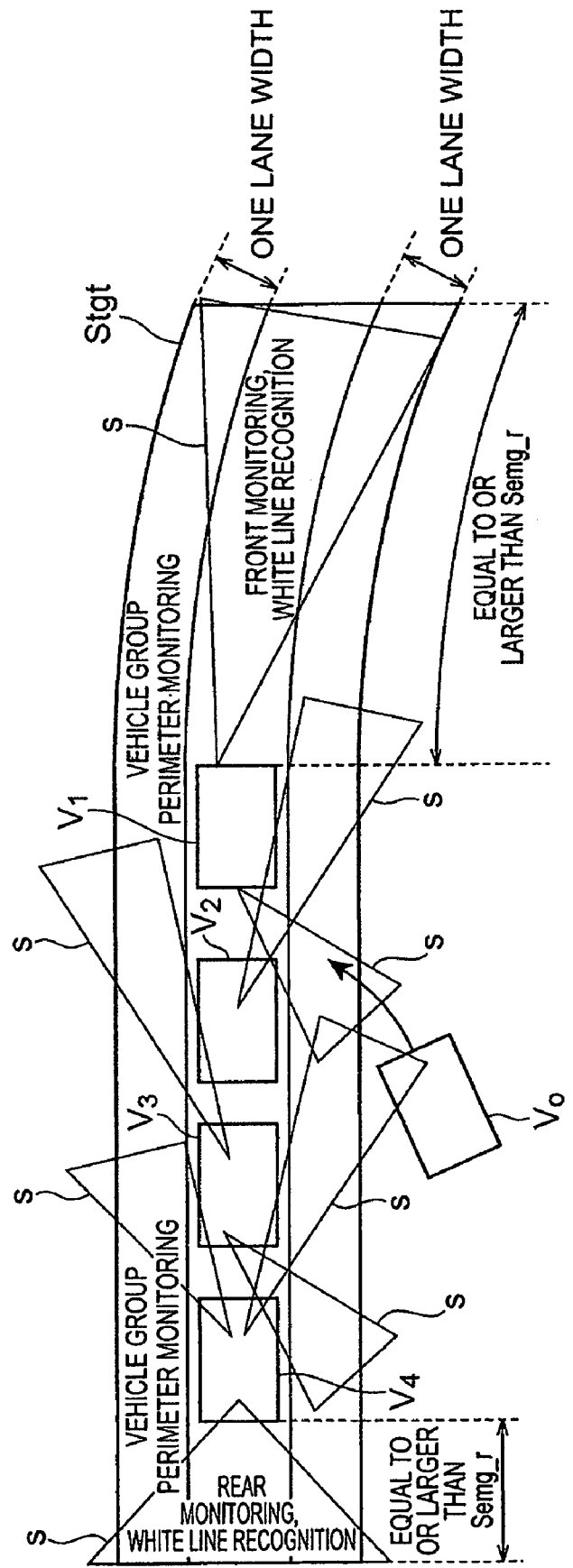
FIG. 3 is a plan view of a perimeter monitoring region in the entire vehicle group.

In the present embodiment, as shown in FIG. 3, the perimeter monitoring region setting unit 30a sets the perimeter monitoring region $S_{tgt}$ that has to be monitored for the entire vehicle group on the basis of the traveling plan of the vehicle group, position of the vehicle group, road information, and terrain information acquired by the information acquisition unit 20 and on the perimeter recognition information obtained with the sensors.

A method for setting the perimeter monitoring region $S_{tgt}$ that has to be monitored by the perimeter monitoring region setting unit 30a will be explained below. A distance $S_{emg\_f}$ that is traveled after an obstacle has been discovered on the road in front of the vehicle group and before the vehicle group can be safely stopped can be represented by the following equation:

$$S_{emg\_f} = V^2/2G_{emg} + V \cdot t_o + \alpha,$$

where V stands for a traveling speed of the vehicle group, $G_{emg}$—a deceleration rate enabling the entire vehicle group to stop safely, $t_0$—a reaction time of the vehicle group from the moment in which the obstacle is recognized to the moment in which braking is started, and $\alpha$—an allowance distance.

The perimeter monitoring region setting unit 30a computes the $S_{emg\_f}$ by the equation presented above for monitoring a range in front of the vehicle group that is equal to or larger than the $S_{emg\_f}$ along the route of the travel plan.

Taking into account the rear end collision of the vehicle $V_o$ outside the vehicle group with the last vehicle of the vehicle group, the distance $S_{emg\_r}$ that enables the vehicle group to wait before being rear end collision of the vehicle traveling behind the vehicle group can be represented by the following equation:

$$S_{emg\_r} = (V_{follow} - V)t_1 + \beta,$$

where V stands for a traveling speed of the vehicle group, $V_{follow}$ stands for a speed of the vehicle group constituent vehicle $V_4$, which is the very last vehicle of the vehicle group, $t_1$—a time required for the entire vehicle group to prepare for rear-end collision after receiving information from the vehicle group constituent vehicle $V_4$, which is the very last vehicle of the vehicle group, and $\beta$—an allowance distance. When $V_{follow}$ is difficult to determine, the $V_{follow}$ may be a representative speed or regulated speed on the road where the vehicle group travels.

The perimeter monitoring region setting unit 30a computes the $S_{emg\_r}$ by the equation presented above for monitoring a range behind the vehicle group that is equal to or larger than the $S_{emg\_r}$ along the route of the travel plan.

As for the sidewise direction, in order to detect rapidly the penetration e.g. of the vehicle $V_o$ outside the vehicle group between the vehicles of the vehicle group or a person jumping to the road from the road shoulder, the width of one lane on the right and left side of the lane in which the vehicle group travels is monitored. Therefore, the perimeter monitoring region $S_{tgt}$ is the region shown by a thick line in FIG. 3.

The logical unit 40a for distributing perimeter monitoring regions among the vehicles computes a real monitoring region $S_{real}$ that can be recognized by the sensors 23 installed at the vehicle group constituent vehicles $V_1$ to $V_4$ on the basis of vehicle type and disposition of vehicle group constituent vehicles $V_1$ to $V_4$, equipment of the sensors 23 installed at the vehicle group constituent vehicles $V_1$ to $V_4$, and information on a mobility region of a detection range of the sensors 23. The real monitoring region $S_{real}$ is a sum total of surface areas of triangles of the monitoring regions s of the vehicle group constituent vehicles $V_1$ to $V_4$ shown in FIG. 3. The logical unit 40a for distributing perimeter monitoring regions among the vehicles determines the recognition range, orientation, etc. of the sensors 23 of the vehicle group constituent vehicles $V_1$ to $V_4$ so as to minimize an evaluation function $S = S_{tgt} - S_{real}$, which represents the difference in surface area between the region that has to be recognized and the recognition region that can be actually recognized. The logical unit 40a for distributing perimeter monitoring regions among the vehicles sends the adjustment command for the determined sensors 23 to the vehicle group constituent vehicles $V_2$ to $V_4$ via the vehicle-to-vehicle communication unit 21 of the information acquisition unit 20.

(Processing Procedure 2: Operations Performed During Elimination of Blind Angle of a Following Vehicle by a Leading Vehicle)

Figure 4:
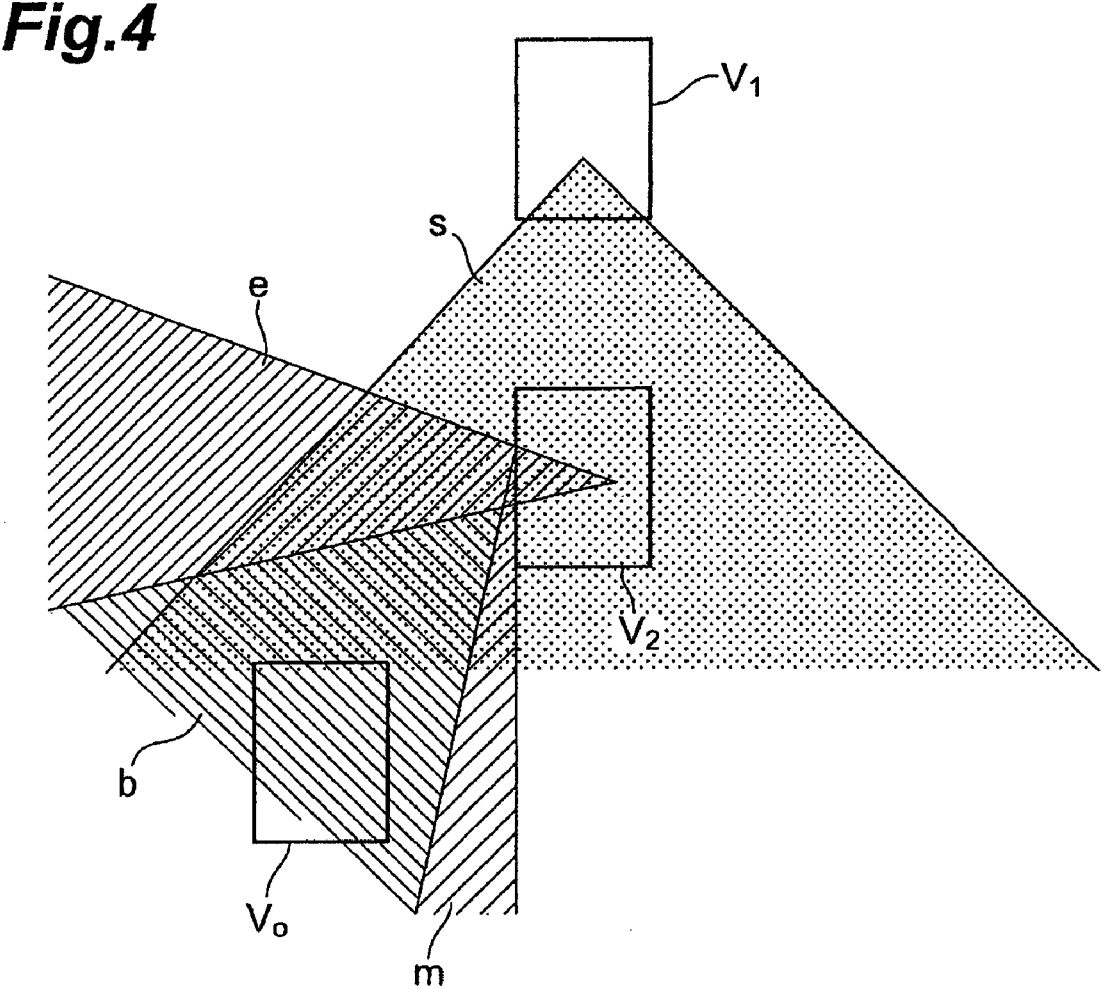
FIG. 4 is a plan view illustrating how a blind angle of a following vehicle is eliminated by a leading vehicle.
Figure 5:
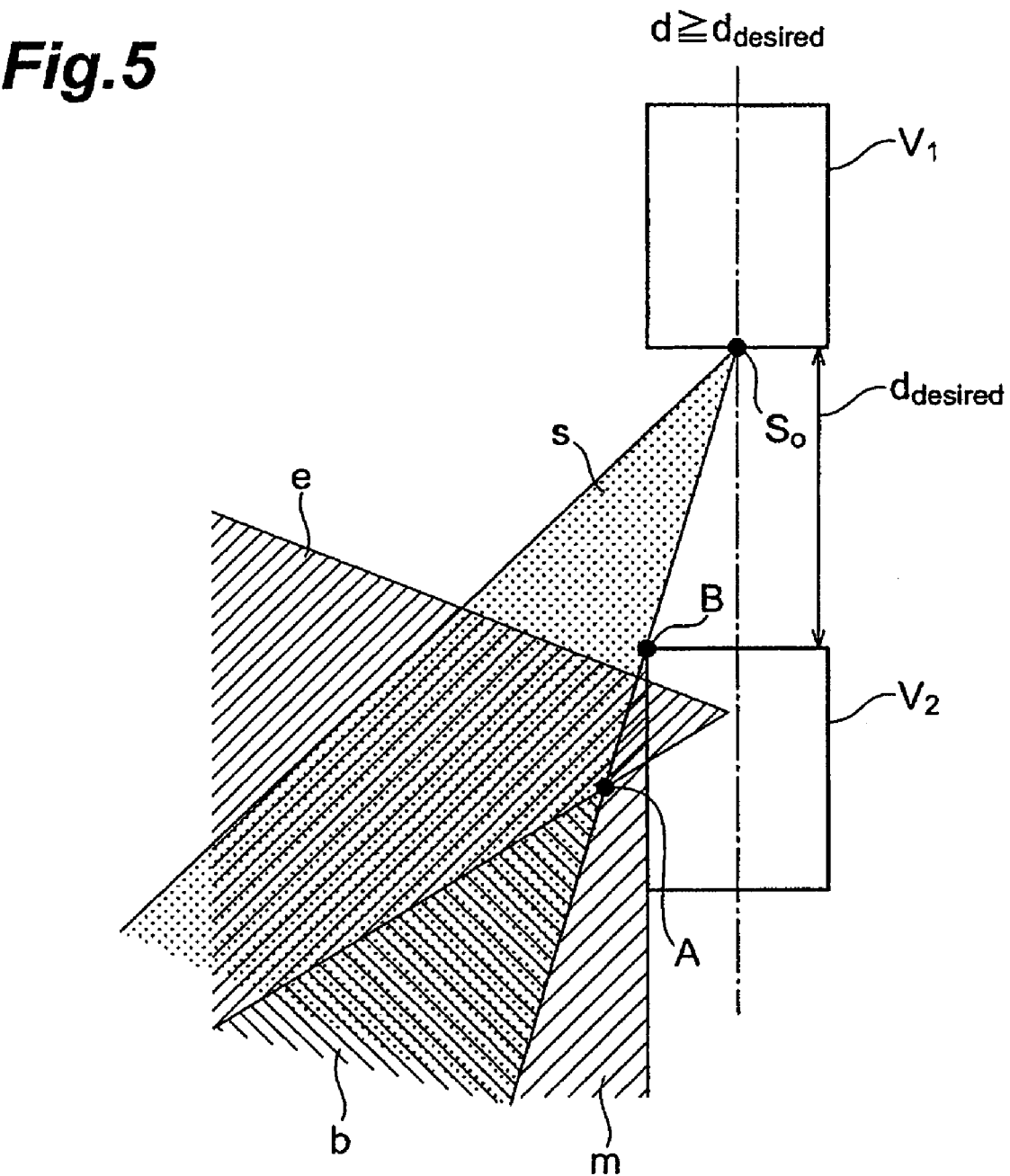
FIG. 5 is a plan view showing a distance between the vehicles that is necessary for eliminating a blind angle of the following vehicle by the preceding vehicle.

Operations performed during elimination of blind angle of a following vehicle by a leading vehicle in the perimeter monitoring device 10a of the present embodiment will be described below. FIG. 4 is a plan view illustrating how a blind angle of the following vehicle is eliminated by the leading vehicle. As shown in FIG. 4, behind the vehicle group constituent vehicle $V_2$ and at one side thereof, there is a blind angle b that is included neither in a driver direct field of vision e that can be directly viewed by the driver, nor in a mirror field of vision m that can be viewed by the driver via the door mirror. Accordingly, in the present embodiment, the blind angle b is reduced when a rearward camera image serving as the monitoring region s of the vehicle group constituent vehicle $V_1$, which is the leading vehicle, is received by the vehicle group constituent vehicle $V_2$, which is the following vehicle.

The logical unit 40a for distributing perimeter monitoring regions among the vehicles of the vehicle group constituent vehicle $V_1$ sets the necessary distance between the vehicles $d_{desire}$. A rearward camera $s_0$ of the vehicle group constituent vehicle $V_1$, which is the leading vehicle, may be on an extension line of the line connecting an intersection point A of the driver direct field of vision e and the mirror field of view m of the vehicle group constituent vehicle $V_2$ and a vehicle front end B of the vehicle group constituent vehicle $V_2$ in order to cover the blind angle b of the vehicle group constituent vehicle $V_2$, which is the following vehicle, with the rearward camera of the vehicle group constituent vehicle $V_1$, which is the leading vehicle. The logical unit 40a for distributing perimeter monitoring regions among the vehicles sets the distance between the vehicles for which the above-described conditions is satisfied both on the left side and on the right side of the vehicle group constituent vehicle $V_2$ as the necessary distance between the vehicles $d_{desire}$.

The logical unit 40a for distributing perimeter monitoring regions among the vehicles sets the traveling plan of the vehicle group constituent vehicles $V_1$, $V_2$ so that the distance d between the vehicle group constituent vehicles $V_1$, $V_2$ satisfies the condition: $d \geq d_{desire}$ and sends the traveling plan that has thus been set to the vehicle group constituent vehicle $V_2$.

Figure 6:
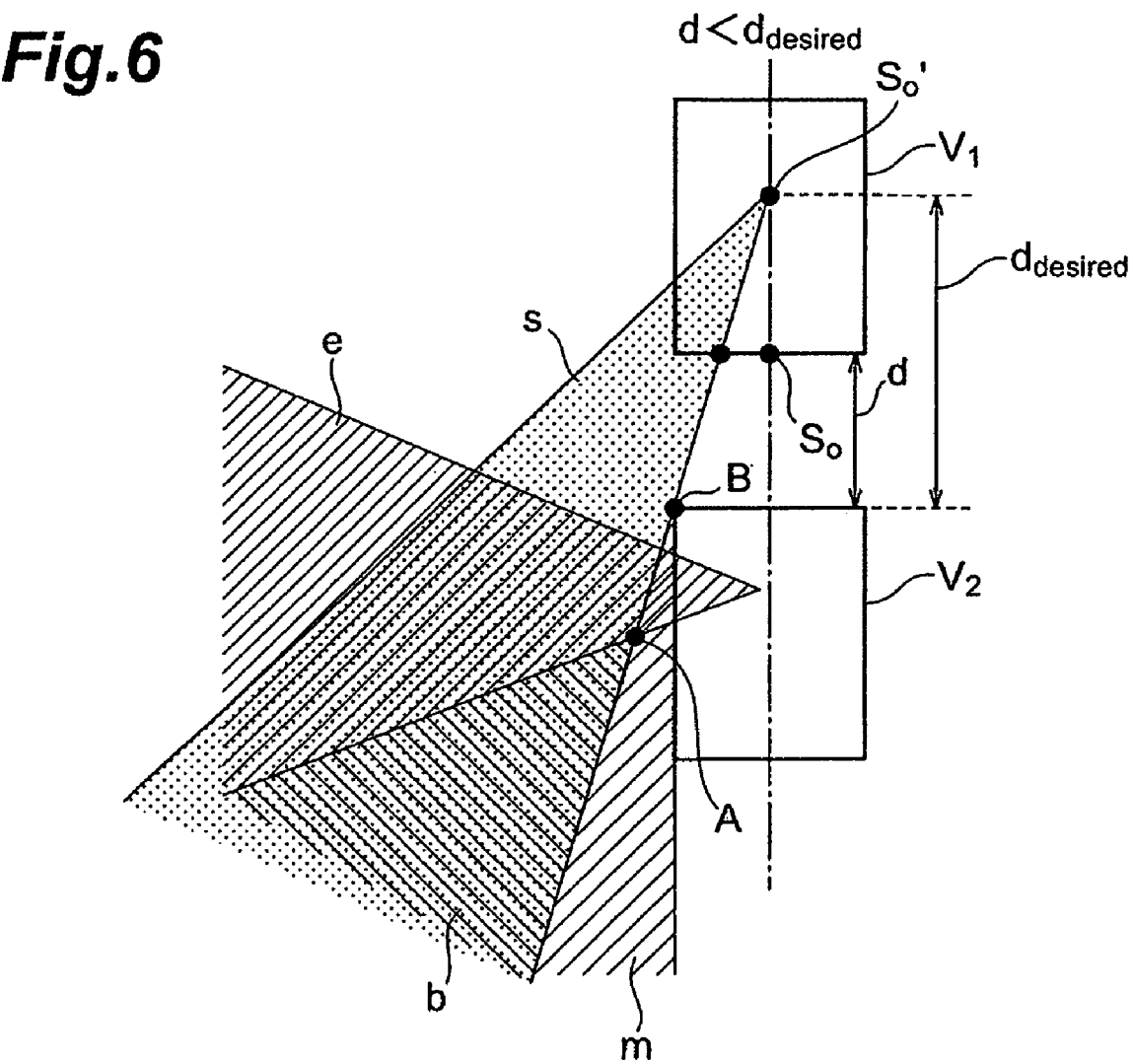
FIG. 6 is a plan view illustrating how a blind angle of a following vehicle is eliminated by a preceding vehicle when the distance between the vehicles is small.

When it is necessary that the distance d between the vehicle group constituent vehicles $V_1$, $V_2$ satisfy the condition: $d < d_{desire}$, as shown in FIG. 6, the logical unit 40a for distributing perimeter monitoring regions among the vehicles changes the focal distance of the rearward camera $s_0$ of the vehicle group constituent vehicle $V_1$. Alternatively, when the vehicle group constituent vehicle $V_1$ is equipped with a plurality of rearward cameras $s_0$, the logical unit 40a for distributing perimeter monitoring regions among the vehicles changes the position thereof to a position $S_o'$ such that the condition $d \geq d_{desire}$ is satisfied.

With the present embodiment, when the vehicle group constituent vehicles $V_1$ to $V_4$ form a vehicle group, the logical unit 40a for distributing perimeter monitoring regions among the vehicles controls the monitoring region s of the sensor 23 of each vehicle so that the monitoring region s is changed with comparison to that during independent traveling. As a result, even in a state in which an area surrounding the vehicle group cannot be sufficiently monitored with the monitoring region s identical to that during independent traveling, the monitoring capacity of the area surrounding the vehicle group can be increased by changing the monitoring region s of the sensor 23 of each vehicle during traveling as a vehicle group.

More specifically, when the vehicle group constituent vehicles $V_1$ to $V_4$ form a vehicle group, the logical unit 40a for distributing perimeter monitoring regions among the vehicles performs control such that the surface area where the monitoring regions s of the sensors 23 of the vehicles overlap is reduced with comparison to that during independent traveling. Therefore, the monitoring region of all the vehicles belonging to the vehicle group is increased and the monitoring capacity of the area surrounding the vehicle group can be further improved. In particular, when the vehicle group constituent vehicles $V_1$ to $V_4$ form a vehicle group, the deceleration rate enabling the entire vehicle group to stop safely is reduced with comparison to that during independent traveling of the vehicle group constituent vehicles $V_1$ to $V_4$. Therefore, when a vehicle group is formed, although the area in front has to be monitored to a larger degree than during independent traveling, in the present embodiment, the logical unit 40a for distributing perimeter monitoring regions among the vehicles performs control such that the monitoring region of the vehicle group constituent vehicle $V_1$, which is a leading vehicle of the vehicle group, is further forward of the vehicle group than during independent traveling of the vehicle group constituent vehicle $V_1$. Therefore, the monitoring capacity in front of the vehicle group can be improved and safety can be increased.

Thus, when a vehicle group is formed, in particular when the distance between the vehicles is small, sensors that monitor the distance between the vehicles, perimeter, and the like, such as a camera, a radar, and a laser, of the following vehicles merely detect the rear end of the leading vehicle and do not demonstrate the perimeter monitoring function. In the present embodiment, the sensors of these vehicles that ceased demonstrating the monitoring function as the sensors of independently traveling vehicles can be effectively employed and safety during vehicle group traveling can be improved. On the other hand, in the present embodiment, when the vehicle group constituent vehicles $V_1$ to $V_4$ form a vehicle group, the logical unit 40a for distributing perimeter monitoring regions among the vehicles controls the monitoring region s by changing the focal distance of the rearward camera $S_0$. Therefore, the monitoring region s can be changed by a simple method and the monitoring region s can be controlled, even without employing, for example, means for changing the orientation of the rearward camera $S_0$. Alternatively, when the vehicle group constituent vehicles $V_1$ to $V_4$ form a vehicle group, the logical unit 40a for distributing perimeter monitoring regions among the vehicles controls the monitoring region of the rearward camera $S_0$ by changing the distance between the vehicles. Therefore, the monitoring region s can be changed by a simple method and the monitoring region s can be controlled, even without employing, for example, means for changing the orientation of the rearward camera $S_0$.

When a vehicle group is formed, in particular when the distance between the vehicles is small, a state is assumed in which the rearward camera of the leading vehicle merely picks up the front portion of the following vehicle. This image includes information relating to a blind angle of the following vehicle that is very valuable for the following vehicle. Therefore, this image is highly valuable for the following vehicle. Accordingly, in the present embodiment, the logical unit 40a for distributing perimeter monitoring regions among the vehicles adjusts the focal distance of the camera of the leading vehicle or sets the distance between the vehicle group constituent vehicles $V_1$ to $V_4$ that form the vehicle group, thereby making it possible to reduce a hidden danger and greatly improving safety.

Merits of traveling in vehicle groups have been considered to include increased efficiency of the entire optimum traffic and improved fuel consumption, but merits of traveling in vehicle groups cannot be said to be significant for individual in the vehicles constituting the group. In the present embodiment, by assembling a vehicle group, is it possible to improve the perimeter monitoring capacity and increase safety over those during independent traveling. Therefore, the present embodiment suggests important technology indispensable for a vehicle-to-vehicle coordination system, this technology greatly increasing merits and advantages of traveling in vehicle groups.

As described hereinabove, sensing functions that are effective during usual independent traveling become ineffective and out of use during vehicle group traveling. For example, a white lane recognition camera cannot operate smartly because the white lane is hidden by the leading vehicle. Further, the head light merely illuminates the rear end of the leading vehicle and loses the inherent function of illuminating the perimeter of the road on which the vehicle travels. A rearward recognition sensor (camera, radar, and the like) merely shows the following vehicle and is not particularly functional or useful. In the present embodiment, these idle functions can be effectively used, thereby making contribution to improved perimeter monitoring performance of the entire vehicle group.

Further, this embodiment has an advantage of being more cost efficient than the method using novel sensors for perimeter monitoring in the entire vehicle group as described in Patent Document 1. Thus, installing novel sensors for vehicle group traveling as described in Patent Document 1 is impractical from the standpoint of cost. By contrast, a method that effectively uses the idle sensors or a method that changes the functions used in independent vehicle traveling is indispensable for the technology aimed at the improvement of perimeter monitoring performance of the entire vehicle group.

Figure 7:
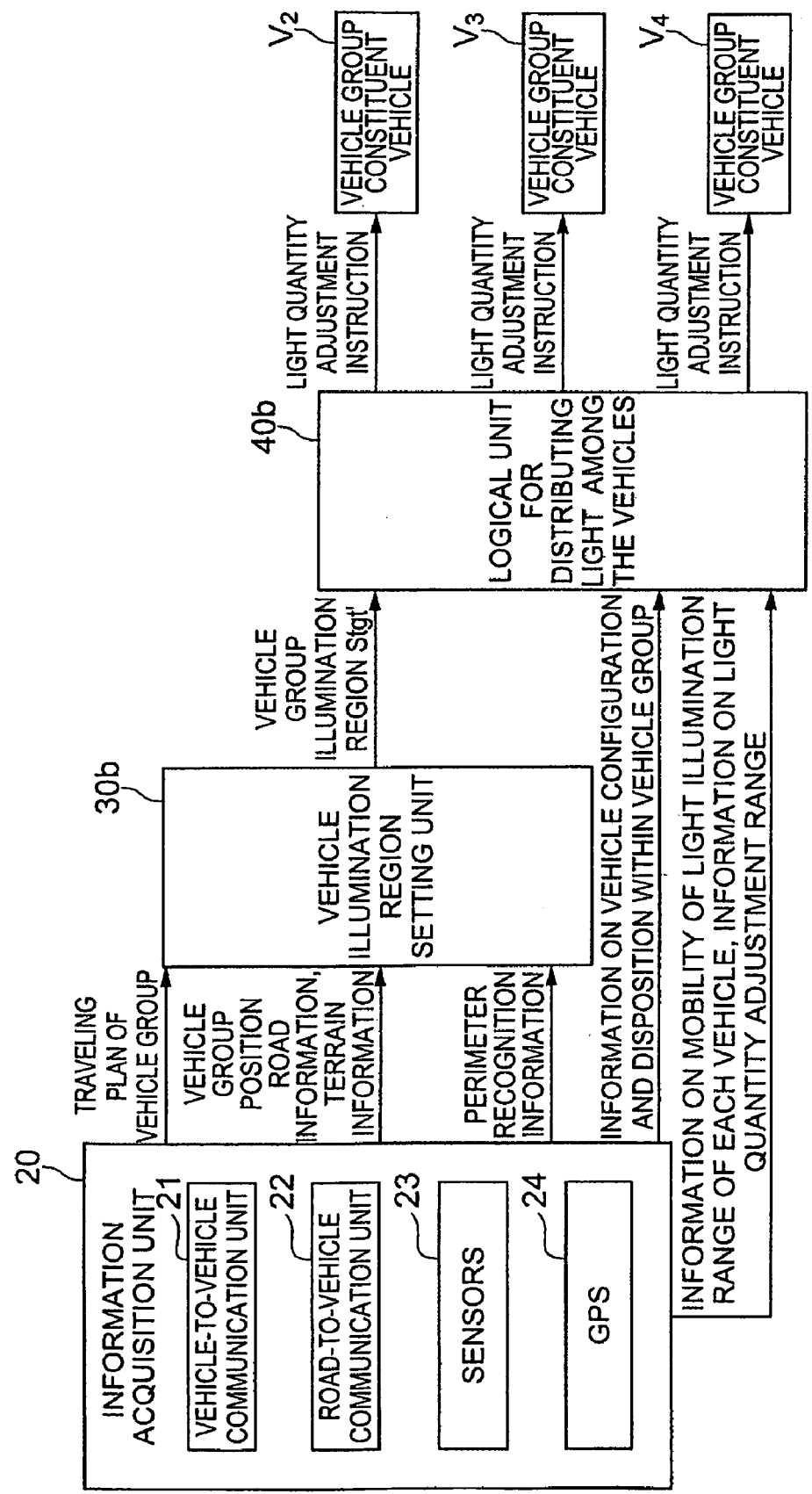
FIG. 7 is a block diagram illustrating the configuration of the perimeter monitoring device of the second embodiment.

The second embodiment of the present invention will be described below. FIG. 7 is a block diagram illustrating the configuration of the perimeter monitoring device of the second embodiment. As shown in FIG. 7, a perimeter monitoring device 10b of the present embodiment includes a vehicle group illumination setting unit 30b instead of the perimeter monitoring region setting unit 30a of the first embodiment and also includes a logical unit 40b for distributing light among the vehicles instead of the logical unit 40a for distributing perimeter monitoring regions among the vehicles. The vehicle group illumination setting unit 30b serves for setting a perimeter monitoring region $S_{tgt}'$ that has to be illuminated by light of the entire vehicle group on the basis of traveling plan of the vehicle group, vehicle group position, road information, and terrain information acquired by the information acquisition unit 20 and also the perimeter recognition information obtained by the sensors. The logical unit 40b for distributing light among the vehicles is designed for controlling light illumination regions set at the vehicle group constituent vehicles $V_2$ to $V_4$ that form the vehicle group on the basis of the perimeter monitoring region $S_{tgt}'$ that has been set by the vehicle group illumination setting unit 30b, information relating to configuration of vehicles within the vehicle group, information relating to the arrangement of vehicles within the vehicle group, and information relating to the mobility region of illumination ranges of light of each vehicle, and information relating to a light quantity regulation range that have been acquired by the information acquisition unit 20. A light distribution adjustment command relating to the vehicle group constituent vehicles $V_2$ to $V_4$ is sent to the vehicle group constituent vehicles $V_2$ to $V_4$ via the vehicle-to-vehicle communication unit 21 of the information acquisition unit 20.

The operation of the perimeter monitoring device of the present embodiment will be described below.

(Processing Procedure 1: Operation During Distribution of Illumination Regions of Vehicles)

Figure 8:
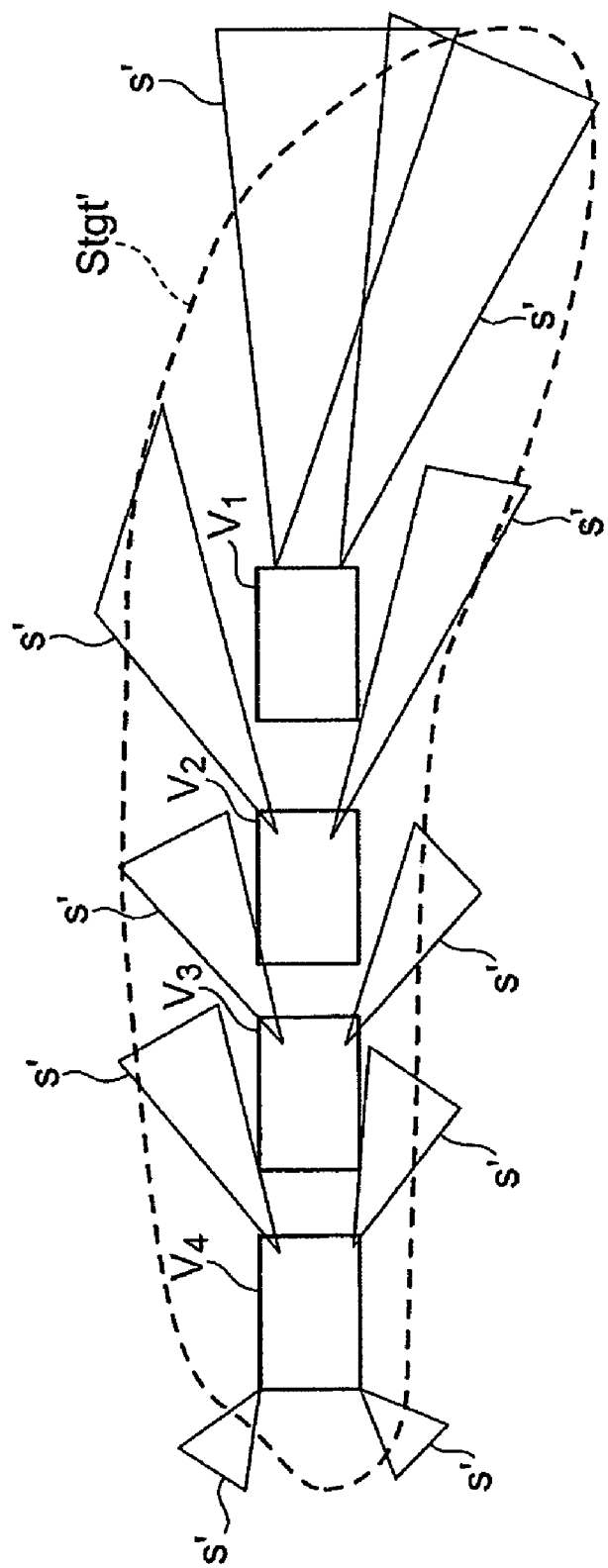
FIG. 8 is a plan view illustrating perimeter monitoring based on performing light distribution control of light in the entire vehicle group.

The operation during distribution of illumination regions of lights of the vehicles in the perimeter monitoring device 10b of the present embodiment will be described below. In the present embodiment, as shown in FIG. 8, the perimeter monitoring device 10b changes the illumination region s' of each vehicle group constituent vehicle $V_1$ to $V_4$ with comparison to that during independent travelling. The below-described operation of the perimeter monitoring device 10b of the present embodiment is assumed to be performed by the perimeter monitoring device 10b installed at the vehicle group constituent vehicle $V_1$, which is the leading vehicle, with respect to the vehicle group constituent vehicles $V_2$ to $V_4$, which are the vehicles that follow the leading vehicle.

Figure 9:
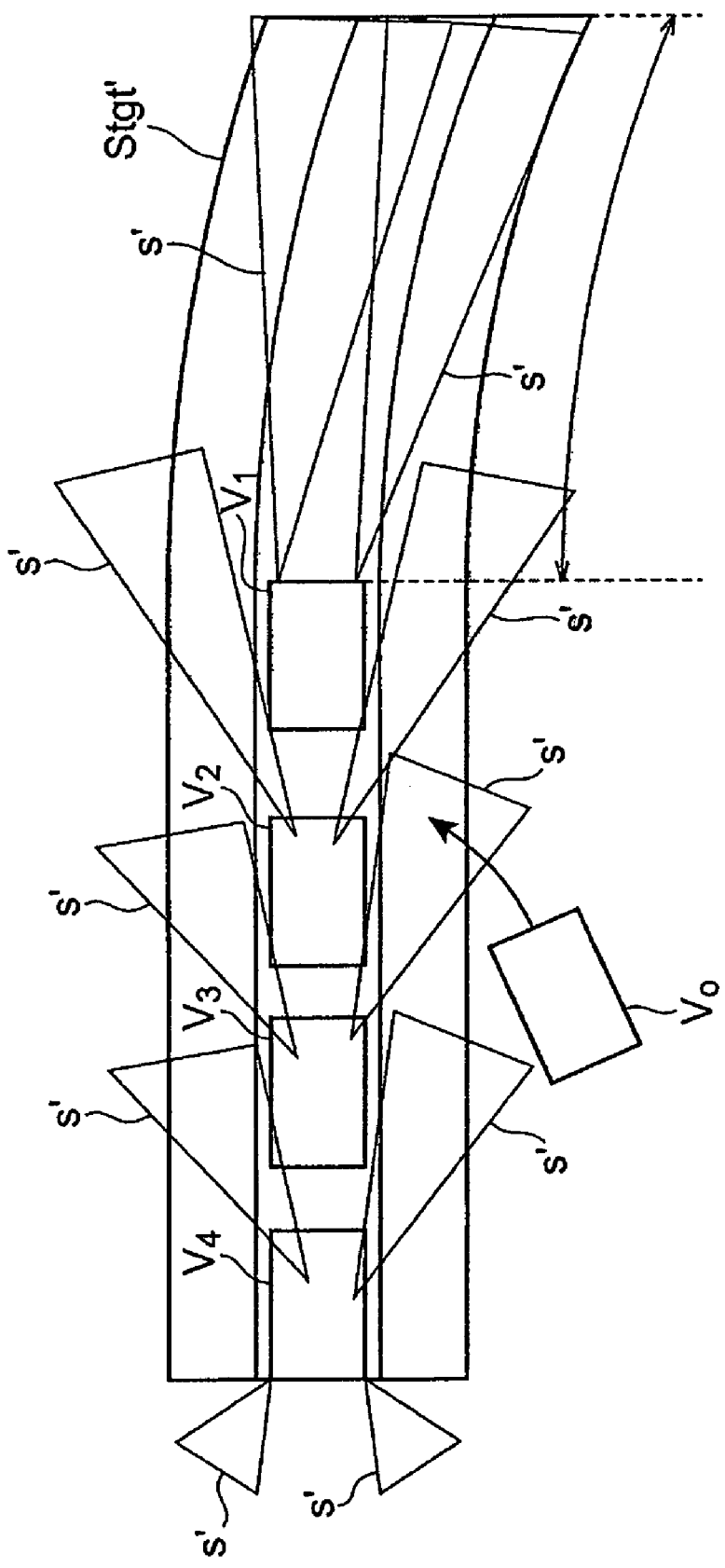
FIG. 9 is a plan view illustrating a perimeter monitoring region based on performing light illumination in the entire vehicle group.

In the present embodiment, as shown in FIG. 9, the vehicle group illumination region setting unit 30b sets the perimeter monitoring region $S_{tgt}{}'$ that has to be illuminated by the lights of the entire vehicle group on the basis of the traveling plan of the vehicle group, position of the vehicle group, road information, and terrain information acquired by the information acquisition unit 20 and on the perimeter recognition information obtained with the sensors.

A method for setting the perimeter monitoring region $S_{tgt}{}'$ that has to be illuminated by the vehicle group illumination region setting unit 30b will be explained below. A distance $S_{emgf}{}'$ that is traveled after an obstacle has been discovered on the road in front of the vehicle group and before the vehicle group can be safely stopped can be represented by the following equation:

$$S_{emgf}{}' = V^2/2G_{emg} + V \cdot t_o + \alpha,$$

where V stands for a traveling speed of the vehicle group, $G_{emg}$—a deceleration rate enabling the entire vehicle group to stop safely, $t_0$—a reaction time of the vehicle group from the moment in which the obstacle is recognized to the moment in which braking is started, and $\alpha$—an allowance distance.

The vehicle group illumination region setting unit 30b computes the $S_{emgf}{}'$ by the equation presented above for illuminating a range in front of the vehicle group that is equal to or larger than the S along the route of the travel plan.

Taking into account the visibility from a vehicle outside the vehicle group, rear side lights and fog lights of the very last vehicle of the vehicle group are switched on. As for the sidewise direction, in order to detect rapidly the penetration e.g. of the vehicle $V_o$, which is outside the vehicle group, between the vehicles of the vehicle group or a person jumping to the road from the road shoulder, the width of one lane on the right and left side of the lane in which the vehicle group travels is illuminated. Therefore, the perimeter monitoring region $S_{tgt}{}'$ is the region shown by a thick line in FIG. 9.

Figure 10:
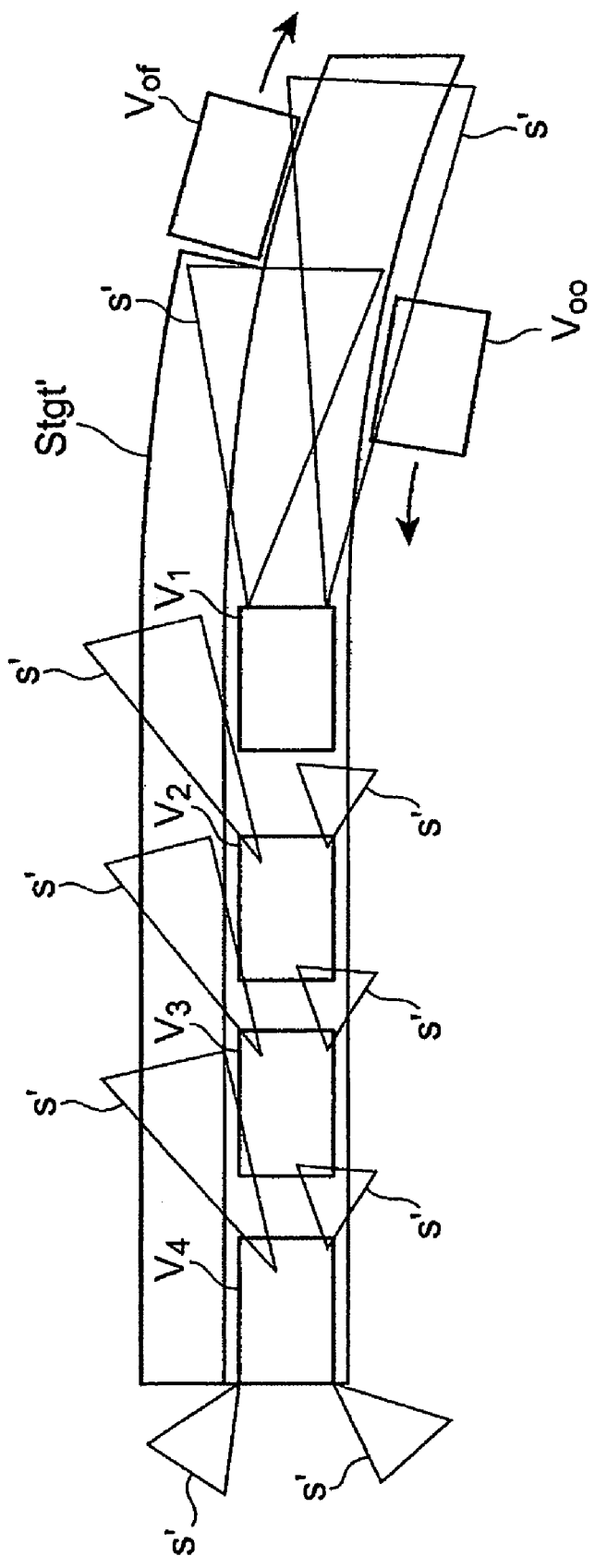
FIG. 10 is a plan view illustrating a perimeter monitoring region in the case in which an oncoming vehicle and a vehicle outside the vehicle group are present.

In the present embodiment, when a vehicle $V_{of}$ that is outside the vehicle group and travels in front of the vehicle group or an oncoming vehicle $V_{oo}$ that is outside the vehicle group is determined to be present close to the vehicle group on the basis of own vehicle position information, lane information, and perimeter recognition information (presence of a vehicle ahead), the perimeter monitoring region $S_{tgt}{}'$ is reduced, as shown FIG. 10, in order to avoid generating glare for the vehicle $V_{of}$ that is outside the vehicle group that travels in front of the vehicle group and the oncoming vehicle $V_{oo}$ that is outside the vehicle group.

Further, in the present embodiment, as shown in FIGS. 9 and 10, a region occupied by the vehicle group constituent vehicles $V_1$ to $V_4$ and a space between the vehicle group constituent vehicles $V_1$ to $V_4$ are excluded from the perimeter monitoring region $S_{tgt}{}'$. This is done to use efficiently the illumination energy and to prevent the driver of the preceding vehicle from being dazzled by the illumination light and the driver of the following vehicle from being dazzled by the light reflected from the rear portion of the preceding vehicle. For example, each light of the following vehicle is directed outward and downward correspondingly to the distance between the vehicles and the position of the rear portion of the preceding vehicle. In the case of lights for which the light distribution control is impossible, only such lights are turned off to save energy.

The logical unit 40b for distributing light among the vehicles computes a real illumination region $S_{real}{}'$ that can be illuminated by the lights of vehicles on, the basis of vehicle type and disposition of vehicle group constituent vehicles $V_1$ to $V_4$, mobility region of the illumination range of the lights installed at the vehicle group constituent vehicles $V_1$ to $V_4$, and light quantity adjustment range. The real monitoring region $S_{real}{}'$ is a sum total of surface areas of triangles of the illumination regions s' of the vehicle group constituent vehicles $V_1$ to $V_4$ shown in FIGS. 9 and 10. The logical unit 40b for distributing light among the vehicles determines the light illumination range, orientation, etc. of the vehicle group constituent vehicles $V_1$ to $V_4$ so as to minimize an evaluation function $S = S_{tgt}{}' - S_{real}{}'$, which represents the difference in surface area between the region that has to be illuminated and the recognition region that can be actually illuminated. The logical unit 40b for distributing light among the vehicles sends the determined light illumination adjustment command to the vehicle group constituent vehicles $V_2$ to $V_4$ via the vehicle-to-vehicle communication unit 21 of the information acquisition unit 20.

(Processing Procedure 2: Operations Performed During Left and Right Turn of a Preceding Vehicle)

Figure 11:
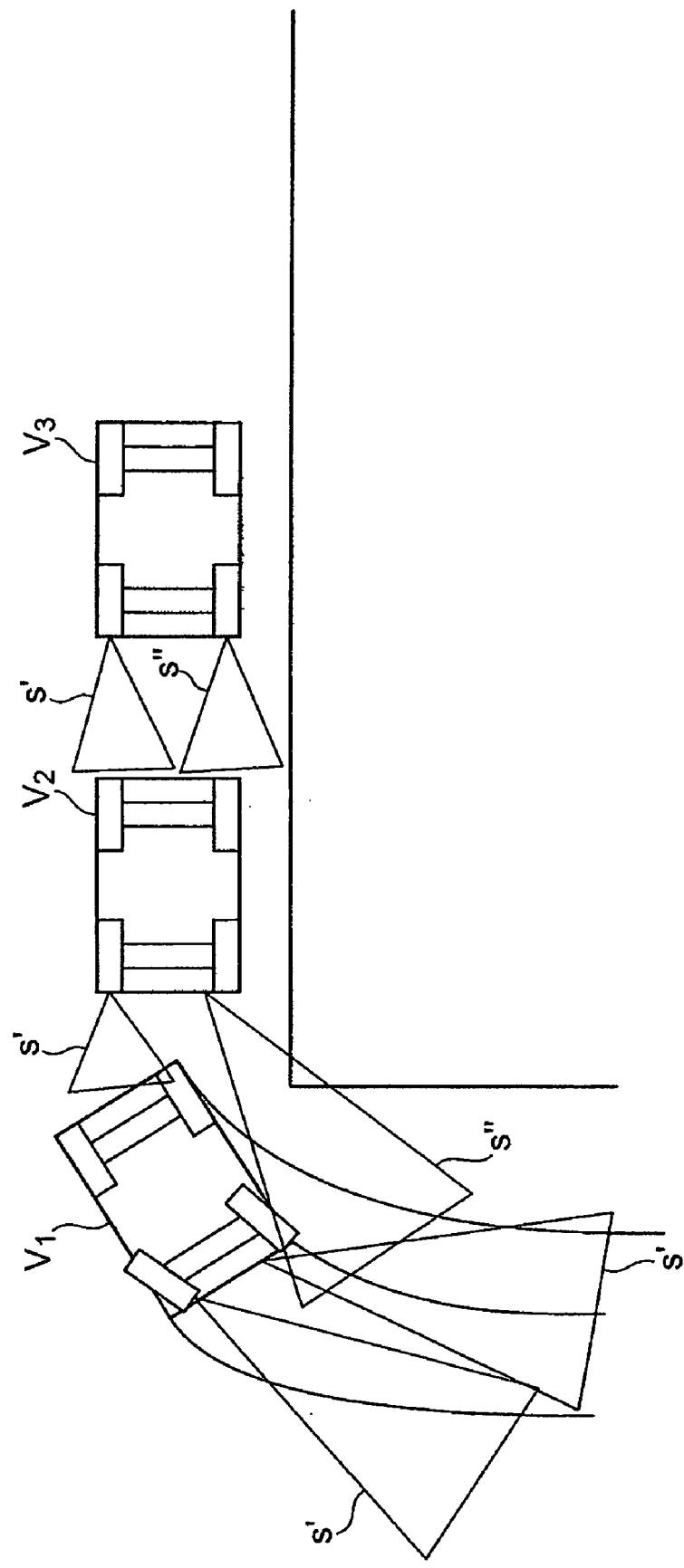
FIG. 11 is a plan view illustrating an illumination region of light of the following vehicle when the preceding vehicle makes a left turn.

Operations performed during left and right turn of a preceding vehicle in the perimeter monitoring device 10b of the present embodiment will be described below. FIG. 11 is a plan view illustrating a light illumination region of the following vehicle when the preceding vehicle makes a left turn. As shown in FIG. 11, when the vehicle group constituent vehicle $V_1$, which is the preceding vehicle, makes a right or left turn, a region corresponding to the difference between the trajectories of the inner front wheel and inner rear wheel into which the rear wheels will thereafter advance is a dark region that is not illumined by the headlights of the own vehicle. When an obstacle such as a bicycle is present in this region, the driver sometimes cannot recognize the obstacle.

When the vehicle group constituent vehicle $V_1$, which is the preceding vehicle, makes a right or left turn, the logical unit 40b for distributing light among the vehicles sends a light distribution adjustment instruction to the vehicle group constituent vehicle $V_2$ via the vehicle-to-vehicle communication unit 21 of the information acquisition unit 20, such that the region corresponding to the difference between the trajectories of the inner front wheel and inner rear wheel into which the rear wheels of the vehicle group constituent vehicle $V_1$ will thereafter advance be included in the illumination region s" of the headlights of the vehicle group constituent vehicle $V_2$, which is the following vehicle. When the vehicle group constituent vehicle $V_2$ makes a right or left turn, the logical unit 40*b* for distributing light among the vehicles sends a light distribution adjustment instruction to the vehicle group constituent vehicle $V_3$ via the vehicle-to-vehicle communication unit 21 of the information acquisition unit 20, such that the region corresponding to the difference between the trajectories of the inner front wheel and inner rear wheel into which the rear wheels of the vehicle group constituent vehicle $V_2$ will thereafter advance be included in the illumination region s" of the headlights of the vehicle group constituent vehicle $V_3$, which is the following vehicle of the vehicle group constituent vehicle $V_2$. Thus, when the vehicle group makes a right or left turn, the logical units 40*b* for distributing light among the vehicles send light distribution adjustment instruction to each vehicle, such that the region corresponding to the difference between the trajectories of the inner front wheel and inner rear wheel into which the rear wheels of the preceding vehicle will thereafter advance be successively included in the illumination region s" of the headlights of the following vehicle. In this case, the region corresponding to the difference between the trajectories of the inner front wheel and inner rear wheel into which the rear wheels of the vehicle group constituent vehicle $V_1$ will thereafter advance may be detected not only by illumination, but also by perimeter monitoring sensors such as image sensors and radars.

In the present embodiment, when the vehicle group constituent vehicles $V_1$ to $V_4$ form a vehicle group, the logical units 40*b* for distributing light among the vehicles control light illumination regions s' of each vehicle so that the illumination regions are changed with comparison to those during independent traveling. As a result, even in a state in which an area surrounding the vehicle group cannot be sufficiently monitored with the illumination regions s' identical to those during independent traveling, the monitoring capacity of the area surrounding the vehicle group can be increased by changing the monitoring regions s' of the lights of each vehicle during traveling as a vehicle group.

More specifically, when the vehicle group constituent vehicles $V_1$ to $V_4$ form a vehicle group, the logical units 40*b* for distributing light among the vehicles perform control such that the surface area in which the illumination regions s' of light of each vehicle overlap becomes smaller than that during independent traveling. Therefore, the illumination region of the vehicles belonging to the vehicle group as a whole increases and the monitoring capacity of the area surrounding the vehicle group can be further increased. As a result, with the present embodiment, the lights of each vehicle can be effectively used in the vehicle group as a whole.

With the present embodiment, when a plurality of vehicles form a vehicle group and when the vehicle group makes a turn, the logical units 40*b* for distributing light among the vehicles perform control such that the region on the inner side of the turn of a vehicle that is a preceding vehicle becomes an illumination region of the light of a vehicle that follows the vehicle that is the preceding vehicle. Therefore, drag-in accidents during right or left turn can be prevented. With the present embodiment, a region corresponding to the difference between the trajectories of the inner front wheel and inner rear wheel, which requires the utmost attention of the driver of the preceding vehicle, can be brightly illuminated, and when an obstacle is present therein, this obstacle can be easily recognized.

Embodiments of the present inventions are described above, but the present invention is not limited to these embodiments and can be modified in a variety of ways.

The invention claimed is:

1. A perimeter monitoring device that controls perimeter monitoring units of a plurality of vehicles each carrying the perimeter monitoring unit that monitors a perimeter, the perimeter monitoring device comprising:
a monitoring region control unit that controls a monitoring region of the perimeter monitoring unit of each vehicle so as to change the monitoring region with comparison to the monitoring region during independent traveling of the vehicles when the plurality of vehicles form a group of vehicles that share at least part of a traveling plan,
wherein the monitoring region control unit performs control such that when the plurality of vehicles form the vehicle group, a surface area in which the monitoring regions of the perimeter monitoring units of the vehicles overlap becomes smaller than a surface area in which the monitoring regions of the perimeter monitoring units of the vehicles overlap during independent traveling of the vehicles.

2. The perimeter monitoring device according to claim 1, wherein the monitoring region control unit performs control such that when the plurality of vehicles form the vehicle group, a monitoring region of the perimeter monitoring unit of the vehicle that is a leading vehicle of the vehicle group becomes further forward of the vehicle group than the monitoring region during independent traveling of the vehicles.

3. The perimeter monitoring device according to claim 1, wherein the monitoring region control unit performs control such that when the plurality of vehicles form the vehicle group, a monitoring region of the perimeter monitoring unit of the vehicle that is a leading vehicle of the vehicle group becomes further forward of the vehicle group than the monitoring region during independent traveling of the vehicles.

4. The perimeter monitoring device according to claim 1, wherein the perimeter monitoring unit is a camera, and the perimeter region control unit controls the monitoring region by changing a focal distance of the camera when the plurality of vehicles form the vehicle group.

5. The perimeter monitoring device according to claim 1, wherein the perimeter monitoring unit is a camera, and the perimeter region control unit controls the monitoring region by changing a focal distance of the camera when the plurality of vehicles form the vehicle group.

6. The perimeter monitoring device according to claim 2, wherein the perimeter monitoring unit is a camera, and the perimeter region control unit controls the monitoring region by changing a focal distance of the camera when the plurality of vehicles form the vehicle group.

7. The perimeter monitoring device according to claim 3, wherein the perimeter monitoring unit is a camera, and the perimeter region control unit controls the monitoring region by changing a focal distance of the camera when the plurality of vehicles form the vehicle group.

8. The perimeter monitoring device according to claim 1, wherein the perimeter region control unit controls the monitoring region of the perimeter monitoring unit by changing a distance between the vehicles when the plurality of vehicles form the vehicle group.

9. The perimeter monitoring device according to claim 1, wherein the perimeter region control unit controls the monitoring region of the perimeter monitoring unit by changing a distance between the vehicles when the plurality of vehicles form the vehicle group.

10. The perimeter monitoring device according to claim 2, wherein the perimeter region control unit controls the monitoring region of the perimeter monitoring unit by changing a distance between the vehicles when the plurality of vehicles form the vehicle group.

11. The perimeter monitoring device according to claim 3, wherein the perimeter region control unit controls the monitoring region of the perimeter monitoring unit by changing a distance between the vehicles when the plurality of vehicles form the vehicle group.

12. The perimeter monitoring device according to claim 4, wherein the perimeter region control unit controls the monitoring region of the perimeter monitoring unit by changing a distance between the vehicles when the plurality of vehicles form the vehicle group.

13. The perimeter monitoring device according to claim 1, wherein when the plurality of vehicles form the vehicle group and the vehicle group makes a turn, the perimeter region control unit performs control such that a region on the inner side of the turn of the vehicle that is a preceding vehicle becomes a monitoring region of the perimeter monitoring unit of the vehicle that follows the vehicle that is the preceding vehicle.

14. The perimeter monitoring device according to claim 1, wherein when the plurality of vehicles form the vehicle group and the vehicle group makes a turn, the perimeter region control unit performs control such that a region on the inner side of the turn of the vehicle that is a preceding vehicle becomes a monitoring region of the perimeter monitoring unit of the vehicle that follows the vehicle that is the preceding vehicle.

15. The perimeter monitoring device according to claim 2, wherein when the plurality of vehicles form the vehicle group and the vehicle group makes a turn, the perimeter region control unit performs control such that a region on the inner side of the turn of the vehicle that is a preceding vehicle becomes a monitoring region of the perimeter monitoring unit of the vehicle that follows the vehicle that is the preceding vehicle.

16. The perimeter monitoring device according to claim 3, wherein when the plurality of vehicles form the vehicle group and the vehicle group makes a turn, the perimeter region control unit performs control such that a region on the inner side of the turn of the vehicle that is a preceding becomes a monitoring region of the perimeter monitoring unit of the vehicle that follows the vehicle that is a preceding vehicle.

17. The perimeter monitoring device according to claim 4, wherein when the plurality of vehicles form the vehicle group and the vehicle group makes a turn, the perimeter region control unit performs control such that a region on the inner side of the turn of the vehicle that is a preceding vehicle becomes a monitoring region of the perimeter monitoring unit of the vehicle that follows the vehicle that is the preceding vehicle.

18. The perimeter monitoring device according to claim 8, wherein when the plurality of vehicles form the vehicle group and the vehicle group makes a turn, the perimeter region control unit performs control such that a region on the inner side of the turn of the vehicle that is a preceding vehicle becomes a monitoring region of the perimeter monitoring unit of the vehicle that follows the vehicle that is the preceding vehicle.

* * * * *